(12) United States Patent
Kang et al.

(10) Patent No.: US 9,697,243 B2
(45) Date of Patent: Jul. 4, 2017

(54) METHOD AND APPARATUS FOR SEARCHING NODE BY USING TREE INDEX

(71) Applicant: TIBERO CO., LTD., Gyeonggi-do (KR)

(72) Inventors: Ingyu Kang, Gyeonggi-do (KR); Sangyoung Park, Gyeonggi-do (KR); Jae Seok An, Gyeonggi-do (KR); Jooho Kim, Gyeonggi-do (KR)

(73) Assignee: TMAXDATA CO., LTD., Gyeonggi-do (KR)

( * ) Notice: Subject to any disclaimer, the term of this patent is extended or adjusted under 35 U.S.C. 154(b) by 235 days.

(21) Appl. No.: 14/260,190

(22) Filed: Apr. 23, 2014

(65) Prior Publication Data

US 2015/0227587 A1    Aug. 13, 2015

(30) Foreign Application Priority Data

Feb. 10, 2014  (KR) .................. 10-2014-0014828

(51) Int. Cl.
*G06F 17/30* (2006.01)

(52) U.S. Cl.
CPC .. *G06F 17/30327* (2013.01); *G06F 17/30551* (2013.01)

(58) Field of Classification Search
None
See application file for complete search history.

(56) References Cited

U.S. PATENT DOCUMENTS 4,823,310 A * 4/1989 Grand ............... G06F 17/30327
5,758,356 A    5/1998 Hara et al.

FOREIGN PATENT DOCUMENTS

JP          3441807         6/2003

* cited by examiner

*Primary Examiner* — Hung Q Pham
(74) *Attorney, Agent, or Firm* — Martin & Ferraro, LLP

(57) ABSTRACT

A node search method, comprising: setting a current time value as a traversing time value; searching descendent nodes to perform a traversing from a root node to a leaf node according to a tree index data structure; determining whether a preset traversing condition is satisfied by comparing an update time value, which indicates a time when a change to a searched descendent node is made, with the traversing time value; depending on whether the traversing proceeding condition is satisfied, re-performing a traversing from a parent node or continuing traversing to the searched descendent node; and terminating the traversing at a leaf node where no descendent node exists.

6 Claims, 3 Drawing Sheets

METHOD AND APPARATUS FOR SEARCHING NODE BY USING TREE INDEX

CROSS-REFERENCE TO RELATED APPLICATIONS

This application is based on and claims priority from Korean Patent Application No. 10-2014-0014828, filed on Feb. 10, 2014, the disclosure of which is incorporated herein in its entirety by reference.

TECHNICAL FIELD

The present disclosure relates to a node search using a tree index; and, more particularly, to a method and apparatus for searching nodes by traversing the nodes from a root node to leaf nodes according to a tree index data structure.

This work was supported by the Ministry of Knowledge Economy in Korea under Project 10040937 [Source Technology Development Business For Industrial Convergence].

BACKGROUND

As well known in the art, an index is a data structure that increases an operating speed for a table in the field of database, and a tree index refers to an index data structure organized in a tree architecture.

A B-tree index, one kind of such a tree index, is a data structure commonly used in a database system to organize a large quantity of data in order and allow rapid access thereto.

The tree index data structure includes a directory node having a descendent node and a leaf node without having a descendent node. Each directory node includes a pointer to another node, and each pointer may be related to an object included in each node.

In a conventional tree index data structure, when there is a process causing a change to the structure of a tree index, it has been required to protect data compatibility of the tree index using a lock in order to compare the tree index while maintaining the data compatibility in another process.

However, such a conventional method of protecting the data compatibility of the tree index using the lock function blocks the tree index from being concurrently accessed by a multiple number of processes. Thus, the method lacks efficiency in the aspect of concurrency.

Further, this method also involves a risk of falling into a dead lock. For example, nodes are searched from a root node to leaf nodes in a process of traversing a B-tree index, whereas, when an index split occurs, the split may spread from a leaf node to a parent node, resulting in a dead lock.

SUMMARY

The present disclosure provides a node searching method and apparatus using a tree index, capable of determining a progression or a retry of a traversing operation based on a comparison result between an update time value and a traversing time value of a searched node.

However, the problems sought to be solved by the present disclosure are not limited to the above description and other problems can be clearly understood by those skilled in the art from the following description.

Exemplary embodiments of the present disclosure provides a node search method, including: setting a current time value as a traversing time value; searching descendent nodes to perform a traversing from a root node to a leaf node according to a tree index data structure; determining whether a preset traversing condition is satisfied by comparing an update time value, which indicates a time when a change to a searched descendent node is made, with the traversing time value; depending on whether the traversing proceeding condition is satisfied, re-performing a traversing from a parent node or continuing traversing to the searched descendent node; and terminating the traversing at a leaf node where no descendent node exists.

In the embodiment, wherein in the process of determining whether the preset traversing condition is satisfied, if the update time value of the searched descendent node is larger than the traversing time value, it is determined that the traversing proceeding condition is not satisfied, and when re-performing a traversing, the traversing is re-performed from the root node or from a parent node higher than the searched descendent node at least one level.

In the embodiment, wherein in the process of determining whether the preset traversing condition is satisfied, when re-performing the traversing from the root node, a current time value is reset as the traversing time value.

In the embodiment, wherein, in the process of determining whether the preset traversing condition is satisfied, if a result of re-performing the traversing from the parent node higher than the searched descendent node at least one level returns back to a node searched before the traversing is re-performed, it is determined that the traversing proceeding condition is satisfied.

Exemplary embodiments of the present disclosure provides a node search apparatus, including: a time setting unit configured to set a current time as a traversing time value; a node searching unit configured to search descendent nodes to perform a traversing from a root node to a leaf node according to a tree index data structure; a traversing condition determining unit configured to determine whether a preset traversing condition is satisfied by comparing an update time value, which indicates a time when a change to a searched descendent node is made, with the traversing time value; a traversing unit configured to, depending on whether the traversing proceeding condition is satisfied, re-perform a traversing from a parent node or continue traversing to the searched descendent node, and terminate the traversing at a leaf node where no descendent node exists.

In the embodiment, wherein the traversing condition determining unit determines that, if the update time value of the searched descendent node is larger than the traversing time value, the traversing proceeding condition is not satisfied, and if it is determined by the traversing condition determining unit that the traversing condition is not satisfied, the traversing unit re-performs the traversing from the root node or from a parent node higher than the searched descendent node at least one level.

In the embodiment, wherein the time setting unit resets a current time value as the traversing time value when re-performing the traversing from the root node.

In the embodiment, wherein the traversing condition determining unit determines that, if a result of re-performing the traversing from the parent node higher than the searched descendent node at least one level returns back to a node searched before the traversing is re-performed, the traversing proceeding condition is satisfied.

According to the exemplary embodiments of the present disclosure, by determining a progression or a retry of a traversing operation based on a comparison result between an update time value and a traversing time value of a searched node, it is possible to protect data compatibility of a tree index without needing to use a lock.

Accordingly, as compared to a conventional method, efficiency in concurrency may be improved. For example, even when a multiple number of processes access a B-tree index, the respective processes are allowed to perform their works independently without interfering with each other. Thus, efficiency in concurrency for the B-tree index can be greatly ameliorated.

Further, in the conventional method, in the event that a split occurs in a tree index, traversing to a subordinate node of a node suffering the split is not allowed until a split operation is completed. According to the exemplary embodiment of the present disclosure, however, since traversing is still allowed even in the middle of the split operation, a dead lock may not be caused.

DETAILED DESCRIPTION

The advantages and features of the present disclosure and the ways to achieve them will become apparent from the following description of exemplary embodiments given in conjunction with the accompanying drawings. The exemplary embodiments will be described in detail so that inventive concept may be readily implemented by those skilled in the art. However, it is to be noted that the exemplary embodiments are not intended to be anyway limiting and various modifications may be made without departing from the technical concept of the present disclosure. The scope of the inventive concept will be defined by the following claims rather than by the detailed description of the exemplary embodiments.

In the following description, when there is a concern that detailed description of functions or configuration known in the pertinent art may hamper clear understanding of the inventive concept of the present disclosure, the detailed description thereof will be omitted. Further, the terms used in this document are defined in consideration of their functions in the exemplary embodiments of the present disclosure, and their definitions may be differed depending on intentions of users or operators or practices. Thus, the definitions of the terms used in this specification should be understood based on the entire disclosure of this document.

The term "time value" used in this specification implies all kinds of information capable of indicating a passage of time. Thus, a time value may include a monotonically increasing counter value, a time stamp value, etc.

Figure 1:
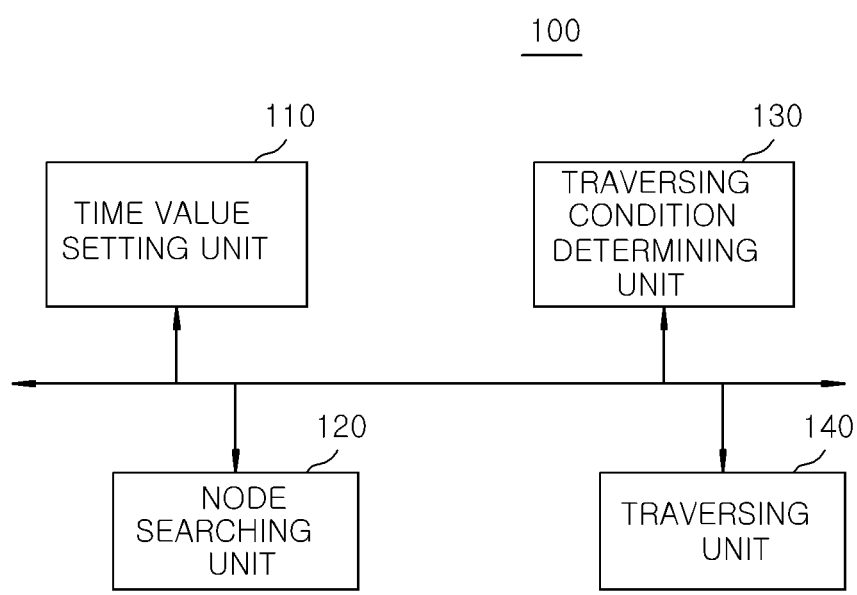
FIG. 1 is a block diagram of a node searching apparatus using a tree index in accordance with an exemplary embodiment of the present disclosure.

FIG. 1 is a block diagram of a node searching apparatus 100 using a tree index in accordance with an exemplary embodiment.

As depicted in FIG. 1, the node searching apparatus 100 in accordance with the exemplary embodiment may include a time value setting unit 110, a node searching unit 120, a traversing condition determining unit 130, a traversing unit 140, etc.

The time setting unit 110 sets a current time value as a traversing time value, and sets an update time value indicating a time when a change to each node is made.

The node searching unit 120 search descendent nodes to perform a traversing from a root node to leaf nodes according to a tree index structure.

The traversing condition determining unit 130 compares an update time value of a descendent node searched by the node searching unit 120 with the set traversing time value, and determines whether the comparison result satisfies a preset traversing proceeding condition. The traversing condition determining unit 130 may determine that, if a time stamp of the descendent node searched by the node searching unit 120 exceeds a traversing time stamp, the traversing proceeding condition is not satisfied. Further, if a result of re-performing the traversing by the traversing unit 140 returns back to a node searched before the traversing is re-performed, it may be determined that the traversing proceeding condition is satisfied.

Depending on the determination result by the traversing condition determining unit 130 upon whether the traversing proceeding condition is satisfied, the traversing unit 140 re-performs a traversing from a parent node, or continues traversing to the descendent node searched by the node searching unit 120. Then, the traversing unit 140 terminates the traversing at a leaf node having no descendent node. If it is determined by the traversing condition determining unit 130 that the traversing proceeding condition is not satisfied, the traversing unit 140 may re-perform the traversing from a root node or from a parent node which is higher at least one level.

Figure 2:
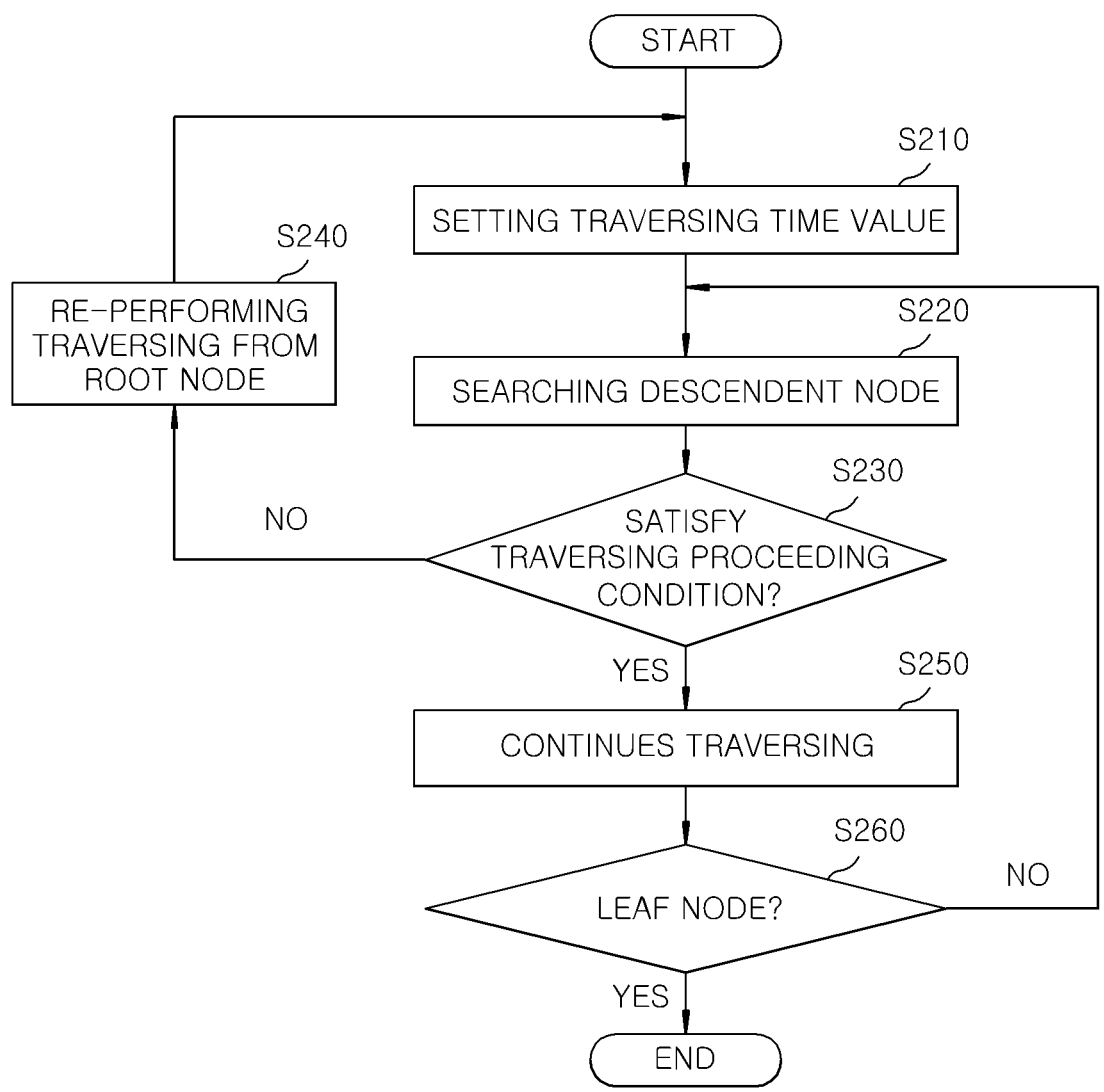
FIG. 2 is a flowchart for describing a node searching method using a tree index in accordance with an exemplary embodiment of the present disclosure.

FIG. 2 is a flowchart for describing a node searching method using a tree index in accordance with an exemplary embodiment.

As depicted in FIG. 2, the node searching method includes a process of setting a current time value as a traversing time value (S210).

The node searching method further includes a process of searching descendent nodes to perform a traversing from a root node to leaf nodes according to a tree index data structure (S220).

Further, the node searching method further includes a process of comparing an update time value indicating a time when a change to a searched descendent node is made, and determining whether the comparison result satisfies a preset traversing proceeding condition (S230).

Then, the node searching method includes a process of, depending on whether the traversing proceeding condition is satisfied, re-performing a traversing from a root node after resetting the traversing time value (S240), or continues the traversing to the searched descendent node (S250).

The node searching method finally includes a process of terminating the traversing at a leaf node where no descendent node exists (S260).

In the following, referring to FIG. 1 and FIG. 2, the node searching method in accordance with the exemplary embodiment, which is performed by the node searching apparatus by using a tree index, will be further elaborated.

First, the time setting unit 110 of the node searching apparatus 100 sets a current time value as a traversing time value and sets an update time value indicating a time when a change to each node is made. By way of example, the time setting unit 110 may set a monotonically increasing counter value or a time stamp value as the time value (S210).

The node searching unit 120 searches descendent nodes to perform a traversing from a root node to leaf nodes according to a tree index data structure, e.g., a B-tree index data structure (S220).

Subsequently, the traversing condition determining unit 130 compares an update time value indicating a time when a change to the descendent node searched by the node searching unit 120 is made with the traversing time value set by the time value setting unit 110, and determines whether the comparison result satisfies a preset traversing proceeding condition (S230).

By way of example, if the update time value of the descendent node searched by the node searching unit 120 exceeds the traversing time value set by the time setting unit 110, the traversing condition determining unit 130 may determine that the traversing proceeding condition is not satisfied. That is, if the descendent node is changed after the traversing is begun, the update time value may be larger than the traversing time value. At this time, the traversing condition determining unit 130 may determine that the traversing proceeding condition is not satisfied. If, however, the descendent node is not changed after the traversing is begun, the update time value may be smaller than or equal to the traversing time value, and, at this time, the traversing condition determining unit 130 may determine that the traversing proceeding condition is satisfied.

Here, if it is determined by the traversing condition determining unit 130 that the traversing proceeding condition is not satisfied, the traversing unit 140 performs a traversing again from the root node (S240). When performing the traversing from the root node again, the time value setting unit 110 resets a current time value as the traversing time value (S210).

Meanwhile, if it is determined by the traversing condition determining unit 130 that the traversing proceeding condition is satisfied, the traversing unit 140 continues traversing to the descendent node searched in the process (S250).

Finally, the traversing unit 140 terminates the traversing at a leaf node where no descendent node exists (S260).

Figure 3:
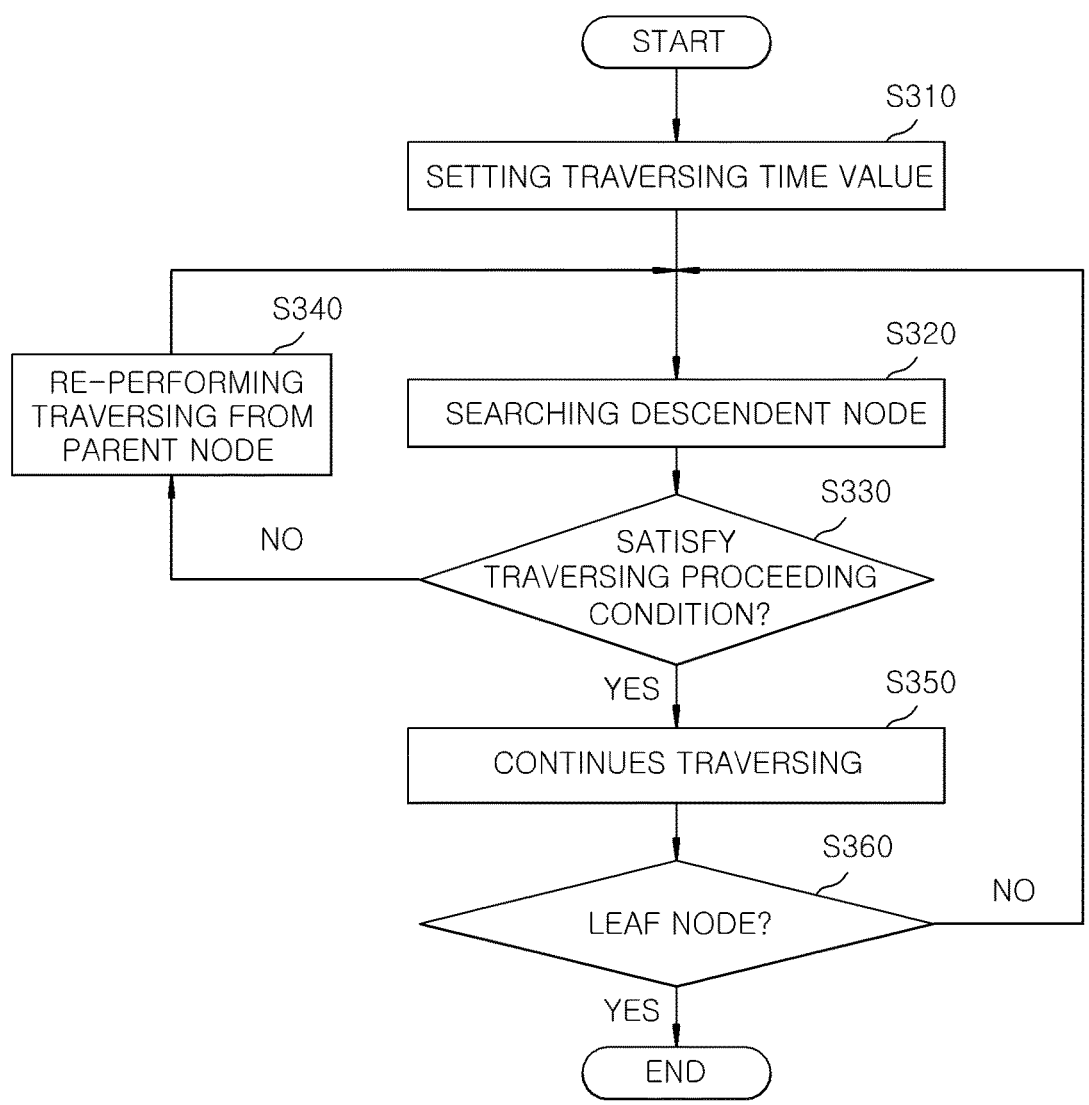
FIG. 3 is a flowchart for describing a node searching method using a tree index in accordance with another exemplary embodiment of the present disclosure.

FIG. 3 is a flowchart for describing a node searching method using a tree index in accordance with another exemplary embodiment.

As depicted in FIG. 3, the node searching method in accordance with this another exemplary embodiment includes a process of setting a current time value as a traversing time value (S310).

The node searching method then includes a process of searching descendent nodes to perform a traversing from a root node to leaf nodes according to a tree index data structure (S320).

Further, the node searching method also includes a process of comparing an update time value indicating a time when a change to the searched descendent node is made, and determining whether the comparison result satisfies a preset traversing proceeding condition (S330).

Then, the node searching method includes a process of, depending on whether the traversing proceeding condition is satisfied, re-performing a traversing from a parent node higher than the searched descendent node at least one level (S340) or continues traversing to the searched descendent node (S350).

The node searching method finally includes a process of terminating the traversing at a leaf where no descendent node exists (S360).

Now, referring to FIG. 1 and FIG. 3, a node searching method in accordance with another exemplary embodiment, which is performed by the node searching apparatus by using a tree index, will be discussed in detail.

First, the time setting unit 110 of the node searching apparatus 100 sets a current time value as a traversing time value and sets an update time value indicating a time when a change to each node is made. By way of example, the time setting unit 110 may set a monotonically increasing counter value or a time stamp value as the time value (S310).

Then, the node searching unit 120 searches descendent nodes to perform a traversing from a root node to leaf nodes according to a tree index data structure, e.g., a B-tree index data structure (S320).

Subsequently, the traversing condition determining unit 130 compares an update time value indicating a time when a change to the descendent node searched by the node searching unit 120 is made with the traversing time value set by the time value setting unit 110, and determines whether the comparison result satisfies a preset traversing proceeding condition (S330).

By way of example, if the update time value of the descendent node searched by the node searching unit 120 exceeds the traversing time value set by the time setting unit 110, the traversing condition determining unit 130 may determine that the traversing proceeding condition is not satisfied. That is, if the descendent node is changed after the traversing is begun, the update time value may be larger than the traversing time value. At this time, the traversing condition determining unit 130 may determine that the traversing proceeding condition is not satisfied. If, however, the descendent node is not changed after the traverse is begun, the update time value may be smaller than or equal to the traversing time value, and, at this time, the traversing condition determining unit 130 may determine that the traversing proceeding condition is satisfied.

Here, if it is determined by the traversing condition determining unit 130 that the traversing proceeding condition is not satisfied, the traversing unit 140 performs a traversing again from a parent node higher than the searched descendent node at least one level (S340). By way of example, the traversing unit 140 may perform the traversing again from a parent node higher than the searched descendent node by one level, or from a grandparent node higher than the searched descendent node by two levels.

If a result of re-performing the traversing returns back to a node searched before the traversing is re-performed in step S340, it may be determined that the traversing proceeding condition is satisfied.

Besides, if it is determined by the traversing condition determining unit 130 that the traversing proceeding condition is satisfied, the traversing unit 140 continues traversing to the descendent node searched in step S320.

Finally, the traversing unit 140 terminates the traversing at a leaf node where no descendent node exists (S360).

As discussed so far, in accordance with the exemplary embodiments, continuation of traversing or retry of traversing is determined based on a result of comparison between an update time value of a searched node and a traversing time value. In this way, it is possible to protect compatibility of tree index data without needing to use a lock. Accordingly, as compared to a conventional method, efficiency in the aspect of concurrency can be improved, and a dead lock may be avoided. Especially, in case of re-performing the traversing, if the traversing is re-performed not from a root node but from a parent node higher than the searched node at least one level, it may be still possible to obtain the same effects while minimizing an increase of time consumption for the node searching process.

Although exemplary embodiments of the present disclosure are described above with reference to the accompanying drawings, those skilled in the art will understand that the present disclosure may be implemented in various ways without changing the necessary features or the spirit of the present disclosure.

Therefore, it should be understood that the exemplary embodiments described above are not limiting, but only an example in all respects. The scope of the present disclosure is expressed by claims below, not the detailed description, and it should be construed that all changes and modifications achieved from the meanings and scope of claims and equivalent concepts are included in the scope of the present disclosure.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure do not limit the present disclosure. The scope of the present disclosure will be interpreted by the claims below, and it will be construed that all techniques within the scope equivalent thereto belong to the scope of the present disclosure.

What is claimed is:

1. A node searching method based on a query performed by a processor, the method comprising:
   setting a current time value as a traversing time value;
   searching, based on the query, descendent nodes of a root node to perform a traversing from the root node to at least one leaf node among the descendent nodes according to a tree index data structure for organizing data in a database system;
   determining at a currently-being-investigated node whether a preset traversing condition is satisfied by comparing an update time value of the currently-being-investigated node among the descendent nodes, which indicates a time when a change to the currently-being-investigated node is made, with the traversing time value;
   traversing to a descendent node of the currently-being-investigated node when the preset traversing condition is satisfied; and
   terminating the traversing from the root node to the at least one leaf node at the at least one leaf node where no descendent node exists,
   wherein if the update time value of the currently-being-investigated node is later than the traversing time value, the preset traversing condition is not satisfied and a re-traversing from at least one parent node is performed, the at least one parent node being at least one level higher than the currently-being-investigated node in view of hierarch in the tree index data structure, and
   wherein the re-traversing from the at least one parent node is performed and traverses back to the currently-being-investigated node, a preset traversing condition of the re-traversed currently-being-investigated node is satisfied without comparing an update time value with a traversing time value at the re-traversed currently-being-investigated node.

2. The node searching method of claim 1,
   wherein when the re-traversing from the at least one parent node is started, the traversing time value is reset as time when the re-traversing is started.

3. A node searching apparatus having a processor, comprising:
   a time setting unit configured to set a current time value as a traversing time value;
   a node searching unit configured to search, based on a query, descendent nodes of a root node to perform a traversing from the root node to at least one leaf node among the descendent nodes according to a tree index data structure for organizing data in a database s system;
   a traversing condition determining unit configured to determine at a currently-being-investigated node whether a preset traversing condition is satisfied by comparing an update time value of the currently-being-investigated node, which indicates a time when a change to the currently-being-investigated node is made, with the traversing time value; and
   a traversing unit configured to, when the preset traversing condition is satisfied, traverse to a descendent node of the currently-being-investigated node, and terminate the traversing from the root node to the at least one leaf node at the at least one leaf node where no descendent node exists,
   wherein if the update time value of the currently-being-investigated node is later than the traversing time value, the preset traversing condition is not satisfied and a re-traversing from at least one parent node is performed, the at least one parent node being at least one level higher than the currently-being-investigated node in view of hierarchy in the tree index data structure, and
   wherein the re-traversing from the at least one parent node is performed and traverses back to the currently-being-investigated node, a preset traversing condition of the re-traversed currently-being-investigated node is satisfied without comparing an update time value with a traversing time value at the re-traversed currently-being-investigated node.

4. The node searching apparatus of claim 3,
   wherein when the re-traversing from the at least one parent node is started, the traversing time value is reset as time when the re-traversing is started.

5. A non-transitory computer-readable medium for searching a node based on a query for performing a process to be executed on a computer, the process comprising:
   setting, by a time setting unit, a current time value as a traversing time value;
   searching, based on the query, by a node searching unit, descendent nodes of a root node to perform a traversing from the root node to at least one leaf node among the descendent nodes according to a tree index data structure for organizing data in a database system;
   determining, by a traversing condition determining unit, at a currently-being-investigated node whether a preset traversing condition is satisfied by comparing an update time value of the currently-being-investigated node, which indicates a time when a change to the currently-being-investigated node is made, with the traversing time value; and
   traversing, by a traversing unit, when the preset traversing condition is satisfied, to a descendent node of the currently-being-investigated node, and terminating the traversing from the root node to the at least one leaf node at the at least one leaf node where no descendent node exists,
   wherein if the update time value of the currently-being-investigated node is later than the traversing time value, the preset traversing condition is not satisfied and a re-traversing from at least one parent node is performed, the at least one parent node being at least one level higher than the currently-being-investigated node in view of hierarchy in the tree index data structure, and wherein the re-traversing from the at least one parent node is performed and traverses back to the currently-being-investigated node, a preset traversing condition of the re-traversed currently-being-investigated node is satisfied without comparing an update time value with a traversing time value at the re-traversed currently-being-investigated node.

6. The non-transitory computer-readable medium of claim 5, wherein when the re-traversing from the at least one parent node is started, the traversing time value is reset as time when the re-traversing is started.

* * * * *

UNITED STATES PATENT AND TRADEMARK OFFICE
CERTIFICATE OF CORRECTION

| | |
|---|---|
| PATENT NO. | : 9,697,243 B2 |
| APPLICATION NO. | : 14/260190 |
| DATED | : July 4, 2017 |
| INVENTOR(S) | : Ingyu Kang et al. |

It is certified that error appears in the above-identified patent and that said Letters Patent is hereby corrected as shown below:

In the Claims

Claim 1, Column 7, Line 54, change "hierarch" to --hierarchy--; and
Claim 3, Column 8, Lines 7-8, change "database s system" to --database system--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*